United States Patent [19]
Van Elzakker et al.

[11] 3,987,278
[45] Oct. 19, 1976

[54] MOVING OBJECT IDENTIFYING SYSTEM

[75] Inventors: Peter J. Van Elzakker; Hugh F. James, both of Fairport, N.Y.

[73] Assignee: The Gleason Works, Rochester, N.Y.

[22] Filed: Oct. 18, 1972

[21] Appl. No.: 298,685

[52] U.S. Cl. .................... 235/61.11 E; 235/92 DP; 340/146.3 K
[51] Int. Cl.² ......................................... G06K 7/10
[58] Field of Search ............. 235/61.11 R, 61.11 E, 235/61.11 D, 92 R, 92 DP, 92 EC, 92 EV, 92 SH; 250/219 D; 340/146.3 K

[56] References Cited
UNITED STATES PATENTS

| | | | |
|---|---|---|---|
| 2,674,727 | 4/1954 | Spielberg | 340/146.1 AG |
| 3,566,083 | 2/1971 | McMillin | 235/61.11 E |
| 3,617,711 | 11/1971 | Smyth | 235/92 EA |
| 3,622,758 | 11/1971 | Schanne | 235/61.11 E |
| 3,701,097 | 10/1972 | Wolff | 235/61.12 N |
| 3,731,064 | 5/1973 | Berler et al. | 235/61.11 E |
| 3,735,096 | 5/1973 | Knockeart et al. | 235/61.11 E |
| 3,746,843 | 7/1973 | Wesner | 235/92 EA |
| 3,778,597 | 12/1973 | Vanderpool et al. | 235 61.11 E |
| 3,784,792 | 1/1974 | Dobras | 235/61.11 E |
| 3,794,812 | 2/1974 | Bryant | 235/61.11 E |

Primary Examiner—Thomas J. Sloyan
Attorney, Agent, or Firm—Cushman, Darby & Cushman

[57] ABSTRACT

A device for reading digital information coded on relatively moving labels independently of the magnitude of the relative velocity, yet without a separate clock track. The device also has the capability of correctly reading such coded information independently of the direction of the relative velocity. Clock pulses are counted between two initial timing marks whereafter a similar number of clock pulses are cyclically recounted to produce successive strobe pulses corresponding to the expected possible occurrences of information marks or bits on the label. The strobe pulses are effectively used to clock a shift register so that the label data is read without need for a separate timing track. A third direction mark or bit is used to set a reversible shift register to shift in a direction corresponding to the existing direction of relative motion thus making the final shift register data contents independent of the actual direction of relative motion.

10 Claims, 12 Drawing Figures

MOVING OBJECT IDENTIFYING SYSTEM

SPECIFICATION

This invention relates generally to apparatus for reading binary coded information from labels, tags or other objects upon which such information has been encoded. The encoded labels are usually affixed to some relatively moving object although it is conceivable that the reading apparatus could itself be in motion to provide the necessary relative motion therebetween.

In the usual case, the binary coded information on the label comprises marks which are organized and spaced according to some predetermined binary code. The marks may comprise small areas having different optical properties from the surrounding areas and/or small areas having different magnetic properties than the surrounding areas and/or other types of sensible marks as will be appreciated by those in the art. In the preferred embodiment of this invention the marks comprise a series of dull black stripes on a strip of highly reflective aluminum foil. This strip of aluminum foil with the encoded dull black markings then comprises a label which is attached to a moving object such as a revolving gear cutter. Typically, the information encoded onto the label will comprise a serial number or the like for identifying the particular cutter to which it is attached.

The apparatus of this invention is then positioned to read this coded label as the cutter revolves. The label reading is performed independently of the direction and/or magnitude of the relative velocity between the cutter and the reading apparatus while the machine continues uninterrupted in its regular work routine. As will be appreciated by those in the art, such a label reading apparatus could be incorporated in a management information system to provide substantially instantaneous on-line data concerning the identification of particular cutters then in use, etc.

In the past, many label reading devices have required at least two tracks of marks to insure proper operation. Typically, one track would be a series of regular uniformly spaced marks comprising a timing or clock track while the other track was encoded to represent the actual information or data. That is, because the code involved on the label is a binary code, it is necessary to sense the absence as well as the presence of an encoded mark. Accordingly, in these kinds of prior art devices, the timing track provided a convenient way to divide the label up into "cells" wherein the device could "look" into each corresponding cell on the data track and determine whether or not a mark was present therein and accordingly whether or not a "1" or a "0" binary data value was to be assigned to that particular cell.

In effect, such prior art machines were required to read two tracks of coded binary marks even though only one of the tracks had any real information content. Since the clock track itself defines the "cells" in the data track, this type of reading process can be made substantially independent of the magnitude of relative velocity between the label and the reading mechanism.

Now, however, with this invention, it is possible to utilize only one binary track on the label and yet still have the reading process continue substantially independent of the magnitude of velocity between the label and the reading device of this invention. That is, the reading device of this invention will operate just as well at a plurality of different cutter speeds so long as the magnitude of velocity is relatively constant throughout any single reading cycle. Actually, since a complete reading cycle is finished during only one pass of the label past the reading device of this invention, this requirement of relatively constant velocity (albeit at virtually any desired magnitude) will almost assuredly be met due to the inherent inertia of the moving object to which the label is attached.

This desired reading operation which requires only a single binary code track on the label and which is yet substantially independent of the relative velocity magnitude is achieved by automatically generating internal timing or strobe pulses in synchronism with the expected occurrence rate of the data "cells" on the relatively moving label. To enable this device to operate in this fashion, the first two data cells on the label are arranged to always contain marks. During the elapsed time between these first two initial timing check bits, clock pulses are counted and accummulated in a register.

Thereafter, the contents of this register (which contents will, of course, depend upon whatever magnitude of relative velocity happens to then exist) is loaded into a reversible counter which is caused to count down or backward at the same rate by gating the same clock pulses thereto. Accordingly, when the reversible counter reaches a "0" contents, this is an indication that the same period of elapsed time has now occurred as previously occurred between the first two initial timing check bits.

Accordingly, at this point in time, a special strobe pulse is generated to clock another binary digit value into a shift register where the coded information is to be accumulated. As will be appreciated, if there is in fact no mark in the data cell when the strobe pulse occurs, a "0" value will be shifted into shift register while a "1" binary value will be shifted into the register if in fact there is a mark present in that corresponding data cell.

Since the timing of the strobe pulses is automatically determined entirely by the transit time or elapsed time between the first two timing check bits, this timing will automatically adjust to whatever magnitude of relative velocity might happen to exist at that point in time. Of course, it will also be appreciated that if the relative velocity magnitude changes appreciably during a single reading cycle, the strobe pulses will be slightly out of phase with the data cell occurrences and will eventually begin to clock erroneous data into the shift register. Accordingly, the magnitude of relative velocity should be relatively constant during a single reading cycle. However, this is not a serious restraint since, as previously explained, this requirement of substantially constant velocity magnitude is almost always met in the real world due to inertia effects.

In addition to the capability of reading independently of the magnitude of relative velocity, it is also many times desirable to read such labels independently of the direction of relative velocity. For instance, in reading indentification labels for rotating gear cutting machinery, the rotational direction of the cutter may change from time to time. Accordingly, a special directional bit is included in the binary code as, for example, in the very next data cell after the timing check bits. If the direction bit is present it is interpreted to mean that the relative direction of velocity is in a first direction while if the direction bit is absent, the opposite direction of velocity is assumed to exist. Of course the direction bit could be placed in any desired predetermined data cell as should be apparent. This information is used to control the data accumulating shift register such that subsequent data values are shifted in from the left or right hand end as appropriate to insure that the final register contents will always correspond correctly with the predetermined binary code structure of the labels. That is, the most significant digits and least significant digits and all those in between will end up in the correspondingly proper stages of the shift register so that their final interpretation will in fact be the correct information content encoded onto the label.

Furthermore, since the first four information bits encountered when reading the label from either direction always have a predetermined pattern in the exemplary embodiment, this pattern is always checked at the end of each complete reading cycle to insure that correct data values have been captured. If an error is detected, the data accumulated in the shift register is not displayed or utilized but is instead cleared from the shift register and the whole apparatus is also cleared to begin another automatic reading cycle. This process will continue in a somewhat iterative fashion until the reading cycle is properly completed whereupon the error check will discover no error and the data then accumulated in the shift register will be gated to decoding and display apparatus as desired.

Of course, the same principles would apply even if clock pulses were counted between more than the two first initial timing check bits. For instance, one might decide to count clock pulses during the first four data cell periods, etc. So long as appropriate steps are taken to subsequently generate the required strobe pulses, in time with the expected occurrence of subsequent data cells, the same desired results will be achieved as should now be appreciated.

Further objects and advantages of this invention will become apparent from the following detailed discussion when read in conjunction with the accompanying drawings of which:

Figure 1:
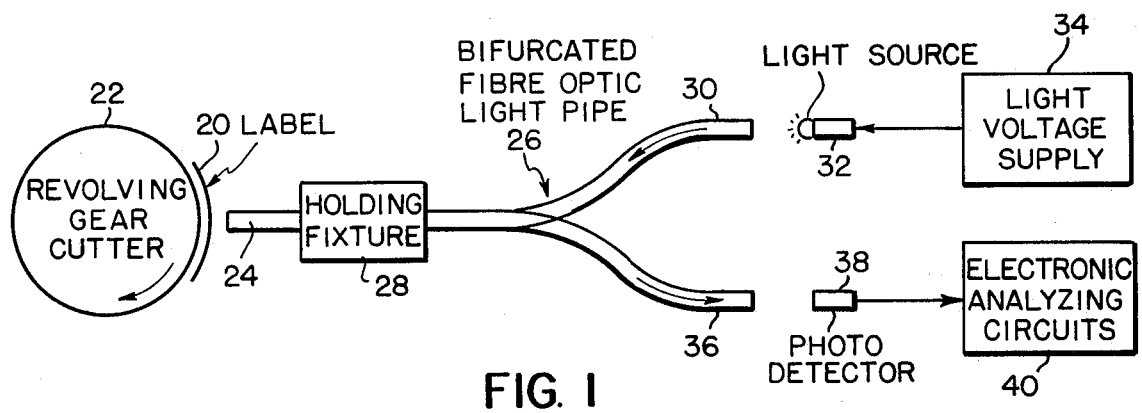
FIG. 1 is a diagrammatic depiction of an exemplary embodiment of this invention adapted for reading identifying labels affixed to a revolving gear cutter mechanism.

A typical application of the exemplary embodiment of this invention is shown in FIG. 1. A binary encoded label 20 is affixed to a revolving gear cutter 22. The common end 24 of a bifurcated fiber optic light pipe 26 is positioned by a holding fixture 28 to scan across the label 20 as the cutter 22 revolves therepast. Approximately one-half of the light pipe fibers are separated into a first end 30 which is illuminated by a light source 32 powered by an appropriate voltage supply 34. Incident illumination thus travels down half of the light pipe fibers 30 to emanate from the common end 24 and thus illuminate a portion of the label 20 then located thereunder. Light reflected from the label 20 is then passed back through the other half of the light pipe fibers to another second end 36 whereupon this reflected light is collected by a photodetector 38 to provide an electrical signal which is then analyzed in circuits 40 to provide a direct read-out and/or other desired utilization of the information or data encoded on the label 20.

As those in the art will appreciate, the label 20 could have information or data other than mere serial number or identification data. Furthermore, the label could obviously be attached to other kinds of moving objects than the revolving gear cutter.

Figure 2:
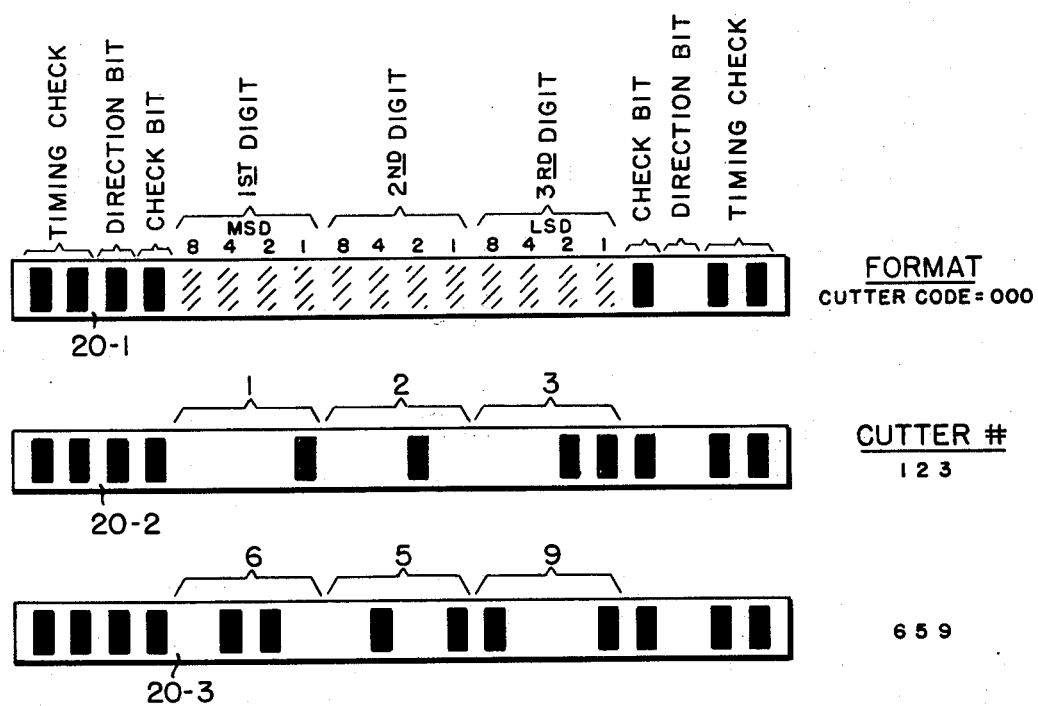
FIG. 2 is an illustration of an exemplary binary coding format for labels to be read by the apparatus of this invention.

An exemplary binary code format for the label 20 is shown generally at 20-1 in FIG. 2. As shown, in this particular exemplary format there are a maximum of 20 data cells in each label. The first four data cells on either end of the label have a predetermined format which is constant regardless of the information or data content of the label. The central 12 data cells are divided into groups of 4 and coded according to the conventional binary coded decimal (BCD) format into a first most significant digit, a second next significant digit at a final third least significant digit of data or information. As should be appreciated, this particular format permits serial number identifications for up to 1000 different labels, i.e., from 000 through 999.

The labels are affixed to the cutter 22 such that when the cutter 22 is revolving in a first direction, the righthand end of the label (as seen in FIG. 2) is first encountered by the label reading apparatus of this invention. On the other hand, if the cutter is revolving in the opposite sense, the lefthand (as seen in FIG. 2) of the label will be first encountered by the reading apparatus.

As can be seen in FIG. 2, no matter which direction (clockwise or counterclockwise) of motion is involved, the first two data cells are always occupied with timing check marks or bits. As briefly explained above and as will be explained in more detail below, clock pulses are counted during the elapsed time interval between detecting the first and second timing check bits and the same number of clock pulses are thereafter cyclically recounted to generate a series of strobe pulses with appropriate timing to occur in correspondence with the remaining data cells of the label as they pass by the reading device of this invention.

The third data cell of the label contains a mark if the label is being read while the cutter is revolving in a first direction but does not contain a mark if the cutter happens to be revolving in the opposite sense. As previously explained in general and as will be explained in more detail below, the presence and/or absence of this third direction bit is utilized to condition a reversible shift register for shifting from one or the other and respectively to insure that the final shift register contents corresponds to the coding format of the label regardless of the rotational direction of the cutter.

The fourth data cell of the label in the exemplary embodiment always contains a mark no matter which direction of rotation is involved. Accordingly, the presence of the check bit in the fourth data cell from either end of the label can be used as a necessary condition for continuing the label reading process. Of course some other data cell could alternatively or additionally be used as this "check bit" as should be apparent. If this fourth check bit is not present, it is assumed that the reading process must have started erroneously (perhaps in the middle of the label) and/or some other error has occurred and the entire apparatus is therefore reset to begin another complete reading cycle. Hopefully, the next reading cycle will actually begin properly at the very beginning of the label (regardless of which direction of motion is involved). However, since the next reading process will definitely begin at some point different from the original beginning point, even if the second try is still in error, the system will iteratively work its way around the peripheral of the cutter such that eventually a reading cycle will begin at a proper point somewhere other than within the label 20.

While the label 20-1 shown in FIG. 2 is generalized in that the middle 12 data cells have hash lines at all possible mark positions (data cells), the labels 20-2 and 20-3 shown in FIG. 2 represent specific labels encoded to represent cutter serial numbers 123 and 659 respectively as should now be understood.

Figure 3:
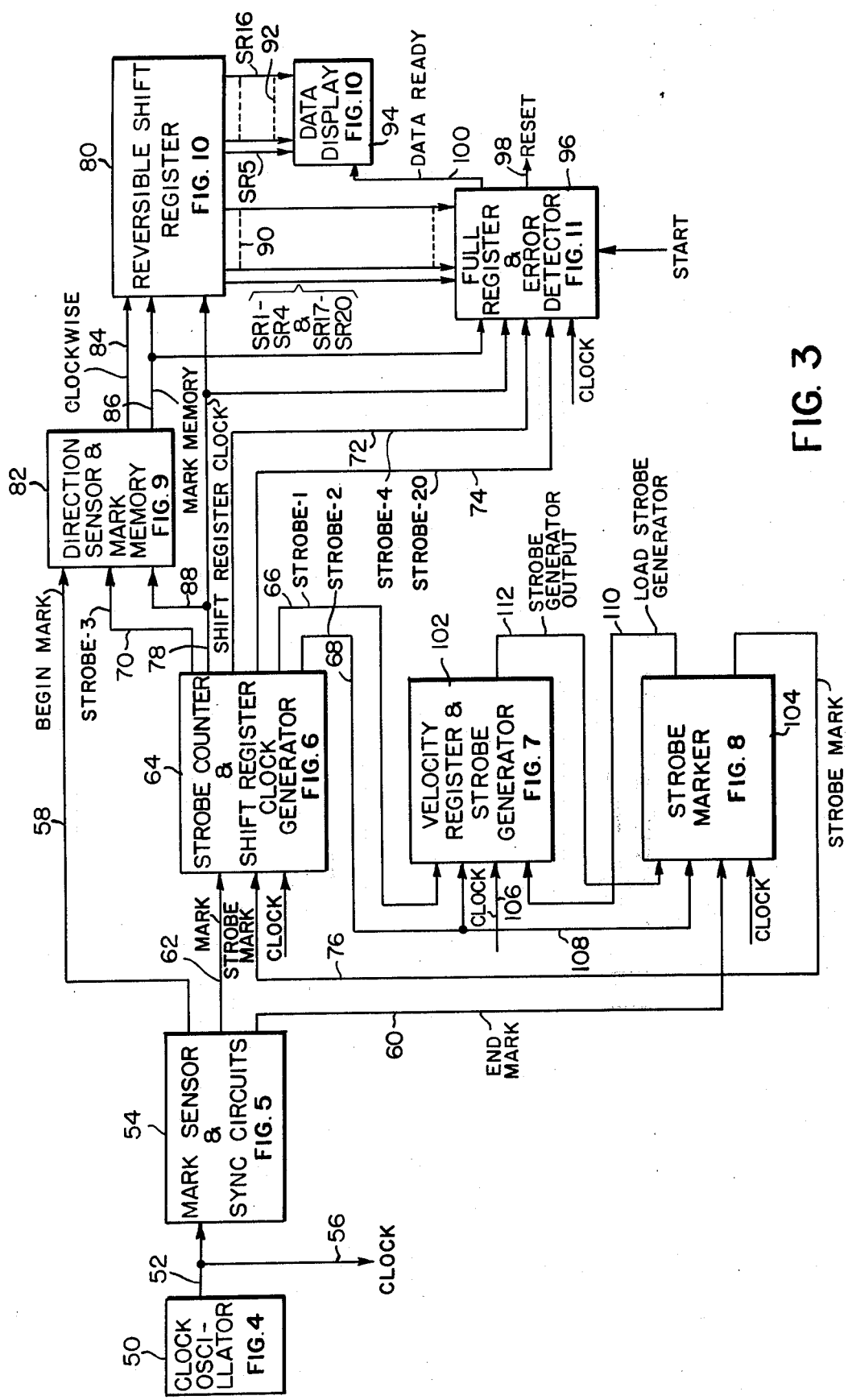
FIG. 3 is an overall block diagram of an exemplary embodiment of this invention.

A generalized block diagram of an exemplary embodiment of this invention is shown in FIG. 3 with specific more detailed schematic diagrams for each of the FIG. 3 blocks shown in more detail in corresponding FIGS. 4 through 11 as noted in FIG. 3. Finally, FIG. 12 comprises a collection of various waveforms with labels corresponding to the labels given in FIGS. 3 through 11. While the individual waveforms shown in FIG. 12 will not be discussed in great detail, the reader may find it helpful to refer from time to time to these waveforms to facilitate his understanding of the detailed discussion of the circuits in the exemplary embodiment of the invention.

The clock oscillator 50 generates a series of clock pulses at its output 52 which occur at a regular recurring rate and which are therefore available for timing and synchronization purposes throughout the remainder of the device. The clock oscillator is shown as directly connected to the mark sensor and synchronization circuits 54; however, many of the other circuits shown in FIG. 3 also have clock inputs which would be connected with line 56 as indicated.

The mark sensor and synchronization circuits 54 would, in the exemplary embodiment, include the light source and bifurcated fiber optic light pipe and photodetector shown in FIG. 1. These circuits provide a begin mark pulse on line 58 at the beginning of a time period during which one of the dull dark marks on the label is passing under a common end 24 of the fiber optic light pipe as shown in FIG. 1. At the end of each such sensed mark, an end mark pulse is generated on line 60. During the time period that such a dark mark is passing under the common end 24 of the light pipe, (between the begin mark on line 58 and the end mark on line 60) a "mark" signal is generated on line 62. Accordingly, as each encoded binary mark passes under the common end 24 of the light pipe 26, a "begin mark" pulse occurs on line 58 in synchronization with the initiation of a "mark" signal on line 62. The mark signal on line 62 continues until the physical mark passes from beneath the fiber optic pipe whereupon an "end mark" pulse is generated on line 60 in synchronism with the disappearance of the mark signal on line 62.

The strobe counter and shift register clock generator 64 serves two functions. First of all, the strobe counter portion of this circuit effectively counts the number of data cells which have been read and provides corresponding outputs such as strobe-1 on line 66; strobe-2 on line 68; strobe-3 on line 70; strobe-4 on line 72 and strobe-20 on line 74 which respectively occur during corresponding reading operations for the 1st, 2nd, 3rd, 4th and 20th data cells encountered. As will be appreciated, the strobe counter circuits cannot simply count the number of marks which occur since, except for the two initial timing marks, there will usually be some data cells without marks occurring therein. Accordingly, a strobe mark signal on line 76 (having strobe pulses thereon timed to coincide with expected mark pulses on line 62) are also input to the strobe counter circuitry for incrementing the strobe counter as should now be apparent.

A special shift register clock output is also generated on line 78 each time the strobe counter is incremented thus signifying that another data cell reading operation is under way and that the reversible shift register 80 should therefore be caused to shift the data by one position thus, making room for another input digit in its first stage.

As should now be apparent, the strobe-3 signal on line 70 will occur in synchronism with the reading of the third data cell on the lable. As previously explained, the third data cell is devoted to a direction bit which, if present, signifies that the label is being read while the cutter is rotating in a first direction. Accordingly, the direction sensor and mark memory circuit 82 utilize the begin mark pulse on line 58 and the strobe-3 mark or signal on line 70 to generate a signal on line 84 is in fact that direction of motion is indicated and/or to indicate the opposite sense of motion by the absence of any signal on line 84 is the opposite direction of motion is indicated.

Furthermore, the begin mark signal on line 58 is utilized to set a flip-flop which generates a "mark memory" signal on line 86 if in fact a mark is being read in that particular corresponding data cell. As should be appreciated, this mark memory signal on line 86 will persist until the flip-flop is cleared. This clearing action is achieved by utilizing the same shift register clock on line 88 as is also utilized for shifting the reversible shift register 80.

Accordingly, it should now be appreciated that the reversible shift register 80 has data input thereto on the line 86, and indication of direction (and therefore an indication of which direction the shifting operation should proceed) on line 84 and a shift register clock signal on line 78 to cause the shifting operation to occur.

Shift register stages 1 through 4 and 17 through 20 correspond, of course, to the first four data cells on either end of the label and are therefore grouped together as outputs 90 for special utilization in error detecting circuitry to be described later. On the other hand, shift register stages 5 through 16 constitute another group of outputs 92 upon which the data values encoded in the middle 12 data cells of the label are input to a data decoding and display circuit 94. Other data utilization devices could also be connected to outputs 92 as will be apparent.

The full register and error detector 96 also has inputs from the mark memory 86, the shift register clock on line 78, the strobe-4 signal on line 72 and strobe-20 signal on line 74. As previously explained, if there is no mark memory signal on line 86 concurrently with the strobe-4 signal on line 72 this is an indication that the check bit which is always contained in the fourth data cell (no matter from which end the label is being read) has not occurred as expected and therefore indicates an error whereupon a reset signal is generated on line 98 for resetting the entire apparatus to begin another cycle of reading operations. On the other hand, if this first error detection stage does not result in a reset on line 98, then the reading process will continue with more data values being shifted into the shift register 80 until finally a strobe-20 signal appears on line 74 thus indicating that the shift register is now filled with what is hopefully, correctly read coded binary data.

At this point in time, before actually displaying the information or data contained in the shift register stages 5 through 16 on line 92, a special check is made to insure that in fact timing check bits have been detected at shift register stages 1, 2, 19 and 20 and that check bits have been detected and stored in both of shift registers stages 4 and 17 and that a direction bit has been recorded in either (but not both) of shift registers stages 3 and 18. If these conditions are met, it is assumed that in fact correct data reading operation has been completed and then after a "data ready" signal is generated on line 100 which causes a transfer of the data values appearing on shift register stages 5 through 16 into the data display device 94 for display and/or other data utilization as will be apparent to those in the art.

The operation of the device as thus far explained has assumed that the strobe marks appearing on line 76 are in fact caused to automatically occur with a timing that corresponds to the expected occurrence of data cells past the mark sensor 54. The elements for achieving this timing are the velocity register and strobe generator circuits 102 and the strobe marker 104 shown in FIG. 3. A clock input on line 106 is gated to a counting register called the velocity register between the occurrence of the strobe-1 signal on line 66 and a strobe-2 signal on line 68 thereby effectively counting clock pulses which occur during the elapsed time interval between detection of the first and second timing check bits in the first and second data cells of the label which are, or course, initially encountered regardless of the particular direction of relative motion involved. Thereafter, the contents of the velocity register is fixed at this value, whatever it may be which will depend upon the magnitude of relative velocity then existing.

The end mark pulse on line 60 is utilized to cause a "load strobe generator" signal on line 110. Accordingly, at the end of detecting the second mark or timing check bit in the second data cell of the label, (at which time the velocity register is correctly filled with a clock count representing the elapsed time period between the timing check bits) a load strobe generator signal is generated on 110 to cause the contents of the velocity register to be transferred to a decrementing counter. Thereafter, the clock pulses on line 106 are gated to the down counter which has just been loaded with an initial content from the velocity register. Accordingly, the decrementing counter will continue to decrement upon each clock pulse occurrence until finally the counter contents is reduced to zero thus corresponding to an elapsed time period equal to that encountered between the first two timing check bits.

Figure 12:
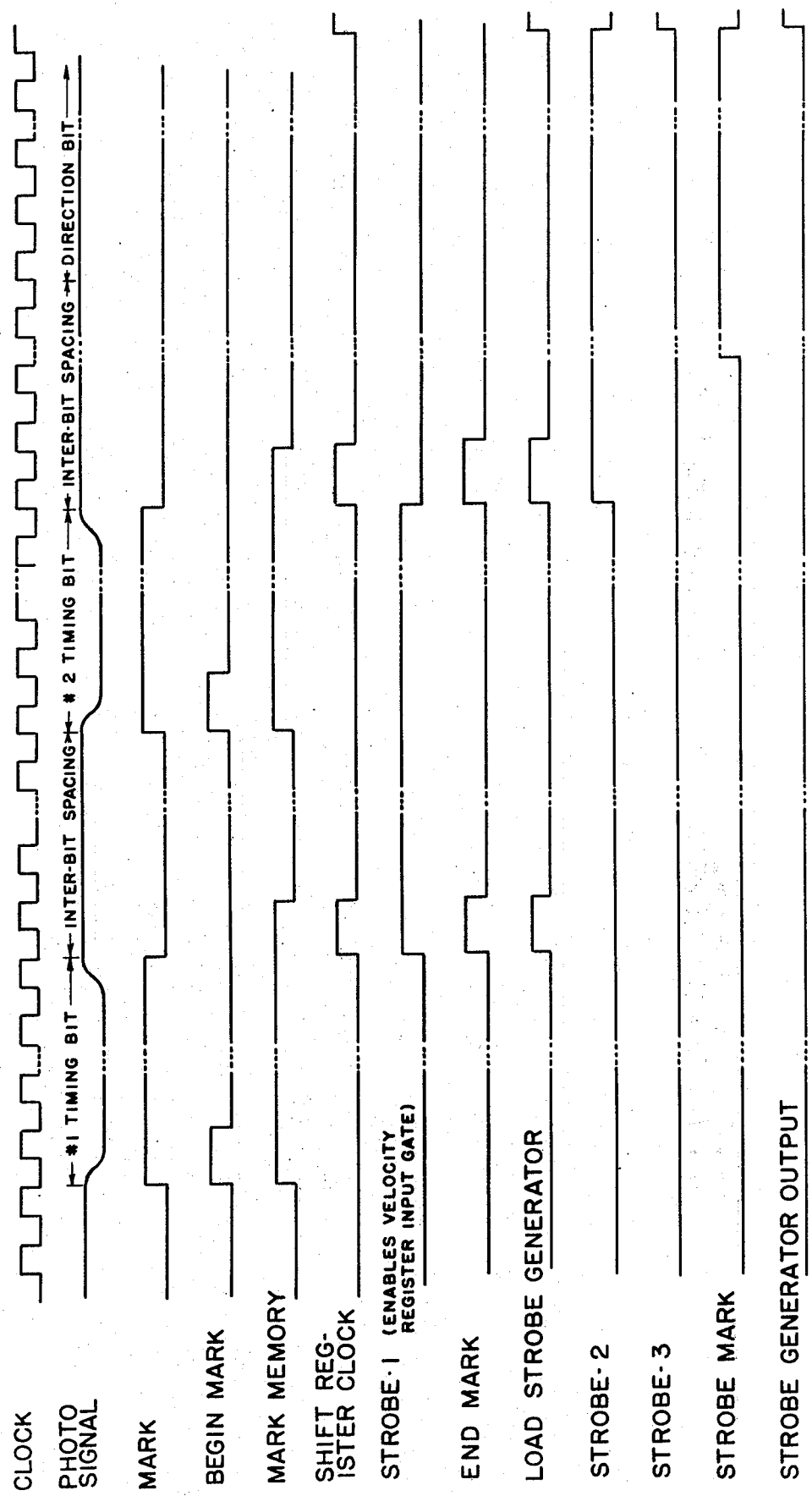
FIG. 12 comprises a series of waveforms occurring at various points in the exemplary embodiment of this invention which are useful in explaining and understanding the operation of the various circuits involved.

At this point in time, a strobe generator output will be generated on line 112 and input to the strobe marker 104 to generator a strobe mark signal (i.e., the negative going transition shown on the next to the last line of FIG. 12) on line 76 thus indicating that the third data cell is now ready for reading. Simultaneously, another load strobe generator signal will be generated on line 110 for again loading the decrementing counter from the velocity register to begin another cycle of down counting. Once again, when the down counting counter reaches a contents of zero, a strobe generator output will be generated on line 112 thus causing another strobe mark to occur on line 76 indicating that the fourth data cell is now in position for reading while at the same time generating another load strobe generator signal on line 110 indicating that the velocity register contents should again be transferred to the decrementing counter for another cycle of down counting. As should now be appreciated, the strobe mark signals appearing on line 76 are indeed timed to coincide with the expected occurrence of subsequent data cells based upon an effective measurement of the elapsed time interval occurring between the detecting of the first two encountered timing check bits.

Figure 4:
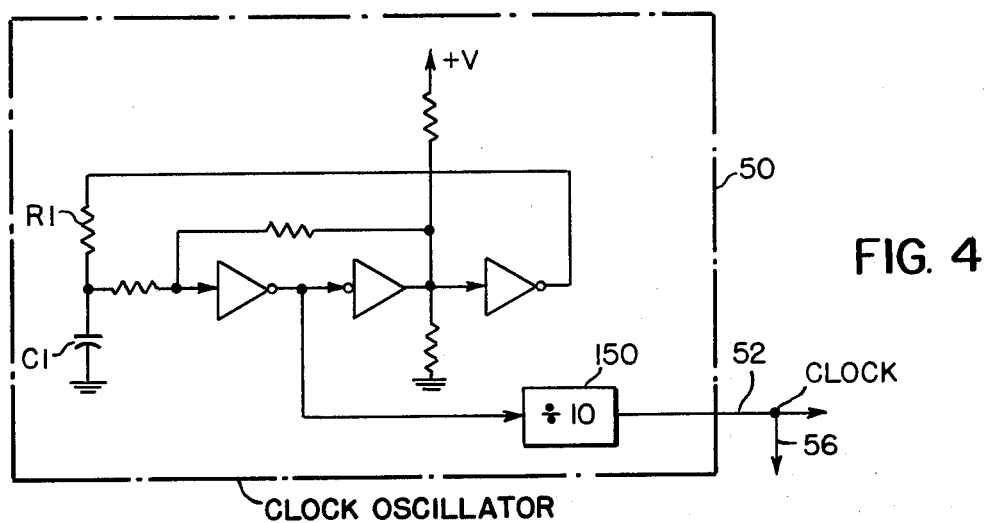
FIG. 4 is a schematic diagram of the clock oscillator circuit shown generally in block form in FIG. 3.

A detailed schematic diagram of the clock oscillator 50 is shown in more detail at FIG. 4. As those in the art will appreciate, this is simply a series of cascaded amplifiers with regenerative feedback, the frequency of oscillation being determined by the parameter values chosen for R1 and C1. In the exemplary embodiment of the invention, R1 and C1 are chosen to cause oscillations to occur at a 4Mz rate. A divide by 10 circuit (i.e., a decade counter) 150 is then utilized to cause the final output clock pulses on lines 52 and 56 to occur at a 400Kz rate. As those in the art will appreciate, other kinds of oscillator circuits could just as well be utilized and furthermore, the actual clock frequency utilized may be changed depending upon the expected ranges of velocity to be encountered and the accuracy with which one wants to measure the elapsed time periods occurring between the timing check bits, etc.

Figure 5:
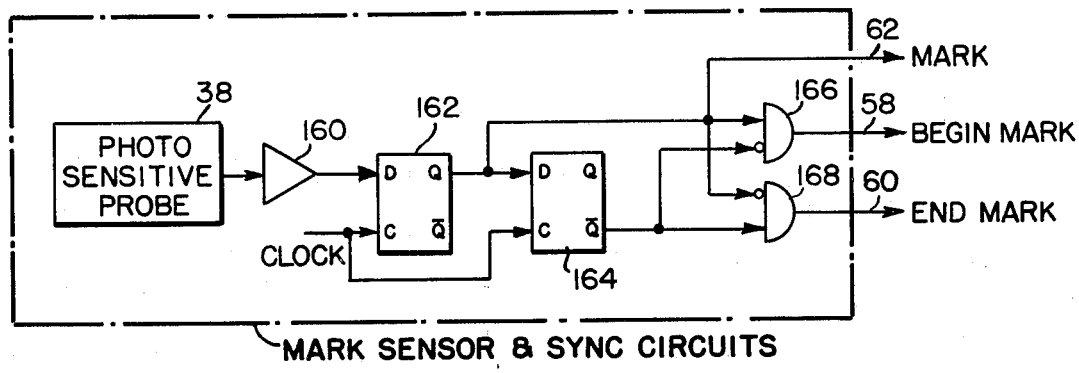
FIG. 5 is a schematic diagram of mark sensing and sychronizing circuit depicted generally in block form in FIG. 3.

As shown in FIG. 5, the photosensitive probe 38 provides an output which is amplified at 160 and then used to enable a D-type flip-flop 162, the Q output of which is used to enable a further D-type flip-flop 164. As one of the dull marks on the label is encountered by the photosensitive probe 38, the output of amplifier 160 will go low thus, enabling flip-flop 162 to transition on the next clock pulse. This transition will cause the Q output of flip-flop 162 to go high and provide a mark signal on line 62. At the same time it will provide one high input to AND gate 166.

Flip-flop 164 has previously been enabled due to the low Q output from flip-flop 162 such that the $\overline{Q}$ output from flip-flop 164 after inversion at the other input of AND gate 166 provides another high input to cause a signal to begin on line 58 as well. On the second clock pulse to occur after encountering a mark, flip-flop 164 will be disabled (due to the high Q output from flip-flop 162) thus causing the $\overline{Q}$ output of flipflop 164 to go high and turn off gate 166. Accordingly, as one of the dull marks is encountered by the photo-sensitive probe 38, signals on line 62 and 58 both go high. The mark signal on line 62 will continue to remain high during the passsage of the dull mark past the photo-sensitive probe, but the begin mark signal on line 58 will again transition low one clock pulse later thus producing a begin mark pulse on line 58.

This state of affairs will continue until the photo-sensitive probe 38 is no longer influenced by the dull mark on the label whereupon flip-flop 162 will be disabled and cause to transition to its "0" state on the next clock pulse occurrence. Through an input inversion, this thereby presents two high inputs to AND gate 168 thus causing the initiation of an end mark signal on line 60. However, one clock pulse subsequent, flip-flop 164 will again transition since it has now been enabled by the low Q output from flip-flop 162 thus removing one of the high inputs from the AND gate 168 and causing end mark pulse on line 60 to disappear one clock cycle after the mark signal has disappeared on line 62.

Figure 6:
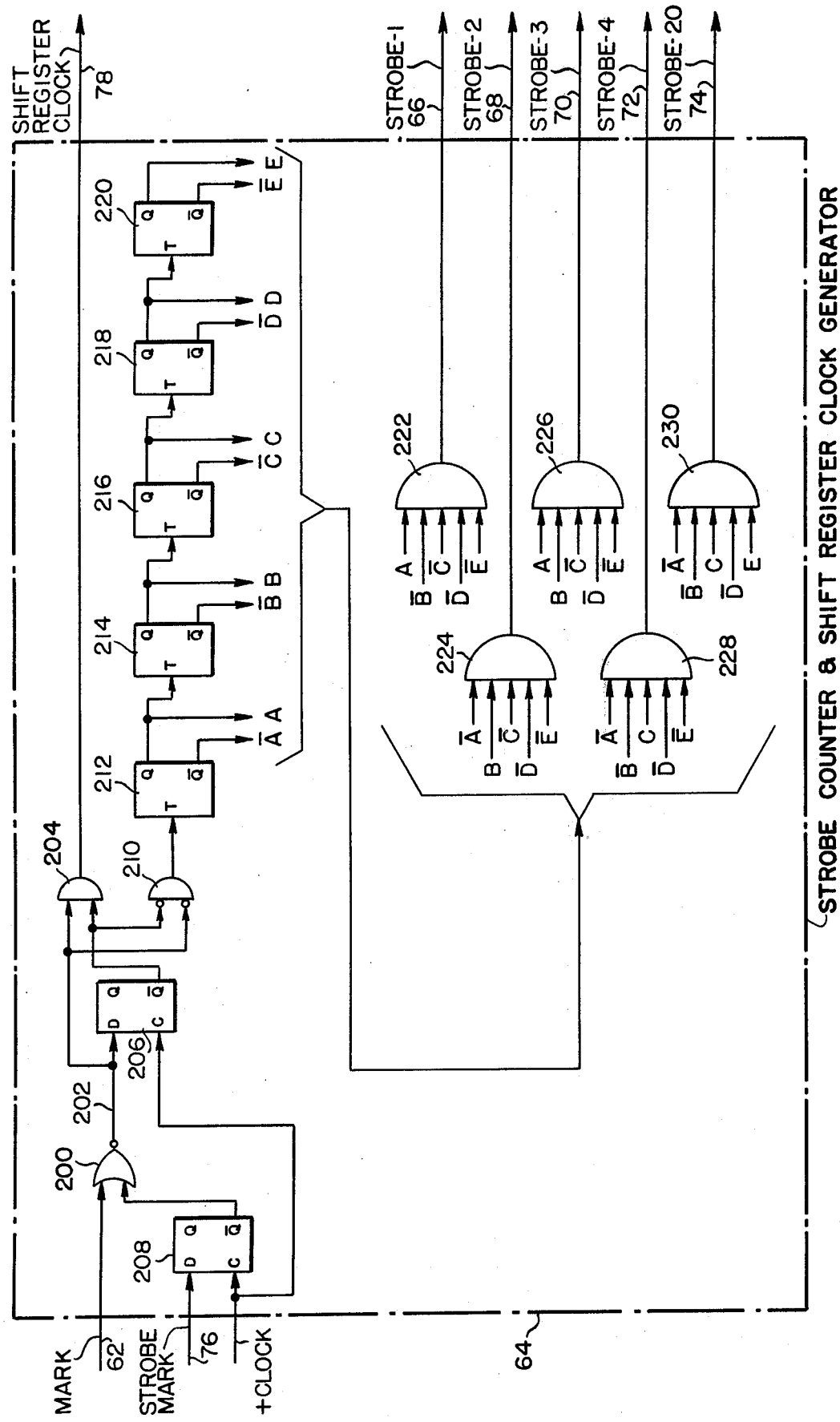
FIG. 6 is a schematic diagram of the strobe counter and shift register clock generator shown more generally in block form in FIG. 3.

The strobe counter and shift register clock generator 64 is shown in detailed schematic form in FIG. 6. When a mark signal occurs on line 62, the NOR gate 200 output on line 202 is caused to go low thus presenting one low input to AND gate 204 while at the same time enabling the flip-flop 206 to transition on the next clock pulse occurrence. Accordingly, on the next clock pulse occurrence, flip-flop 206 will transition to provide a low $\overline{Q}$ output. This state of affairs will continue until the mark signal on line 62 disappears whereupon the NOR gate 200 output on line 202 will go high thus presenting one high input to gate 204 and the flip-flop 206 will be disabled such that it will again transition on the next clock cycle to provide a high $\overline{Q}$ output thereby providing a shift register clock output on line 78 just after the termination of the mark signal on line 62. A similar sequence of events will occur for the strobe mark appearing on line 76 as well since this strobe mark enables and disables flip-flop 208, the output of which is utilized as another input to the NOR gate 200 as shown in FIG. 6.

A NAND gate 210 is also shown in FIG. 6 having its inputs connected in parallel with gate 204. The output of NAND gate 201 is utilized to trigger the first stage of a five-stage binary counting chain comprising flip-flops 212, 214, 216, 218 and 220 as shown in FIG. 6. The outputs of this fivestage binary counting chain are connected as shown in FIG. 6 to appropriate decoding circuitry which may, for instance, comprise appropriate gates such as 222, 224, 226, 228 and 230 as indicated in FIG. 6. The output of these gates which is, of course, dependent upon the contents of the binary counting chain, then provides the appropriate strobe-1, strobe-2, strobe3, strobe-4 and strobe-20 signals on lines 66, 68, 70, 72 and 74 respectively all as shown in FIG. 6.

Figure 7:
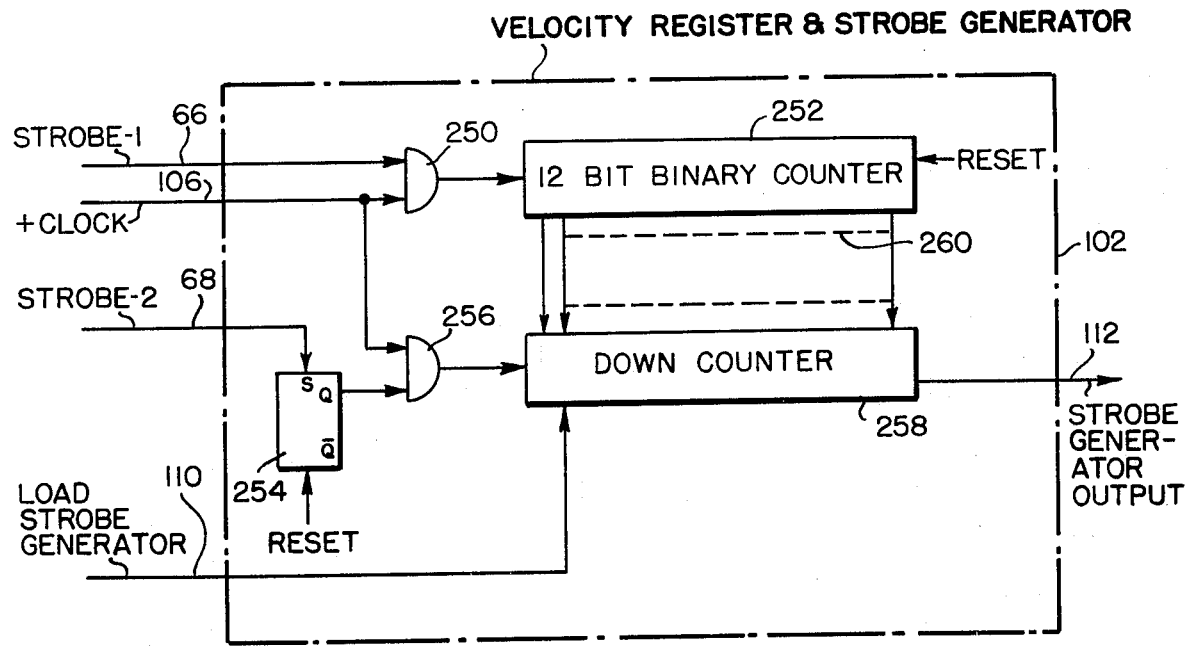
FIG. 7 is a detailed schematic diagram of the velocity register and strobe generator shown more generally in block form in FIG. 3.

The velocity register in strobe generator 102 is shown in more detailed schematic form in FIG. 7. As shown, AND gate 250 is enabled only during the occurrence the strobe-1 pulse on line 66, which of course, occurs at common phase points of the first and second timing check bits as should now be apparent. During this time period, clock pulses on line 106 are gated into a 12-bit binary counter 252. As previously explained, at the termination of this initial counting cycle during the elapsed time occurring between the timing check bits, the binary counter 252 will have a contents which depends upon the magnitude of relative velocity then existing between the target and reading device. Of course, as soon as the strobe-1 signal is removed on line 66, the gate 250 is disabled such that the binary counter 250 retains its contents until reset. However, the strobe-2 on line 68 is utilized to set flip-flop 254 which, in turn, enables gate 256 to thereafter pass the clock pulses on line 106 there through to decrement a down counter 258 which is connected to provide an output on line 112 whenever its contents coincide with "0". Of course, some other predetermined contents than "0" could also be utilized as will be appreciated by those in the art.

The load strobe generator signal on line 110 is connected to the down counter to cause the contents of the binary counter 252 as appearing on lines 260 to be transferred into the down counter whereupon the down counter will continue to decrement on the occurrence of clock pulses gated thereto until a contents of "0" is achieved whereupon a strobe generator output will be provided on line 112 as should now be apparent.

The binary counter 52 is conventionally available and may, for instance, comprise three type-161 integrated circuit 4-bit binary counter stages connected together in cascade as will be apparent to those in the art. The down counter 258 may, for instance, comprise a reversible counter composed of type-193 integrated circuits also connected together in cascade as will be apparent to those in the art. Of course, if integrated circuits are not to be utilized, other types of conventional reversible up-down counters, etc. can be utilized as should be apparent to those in the art.

Figure 8:
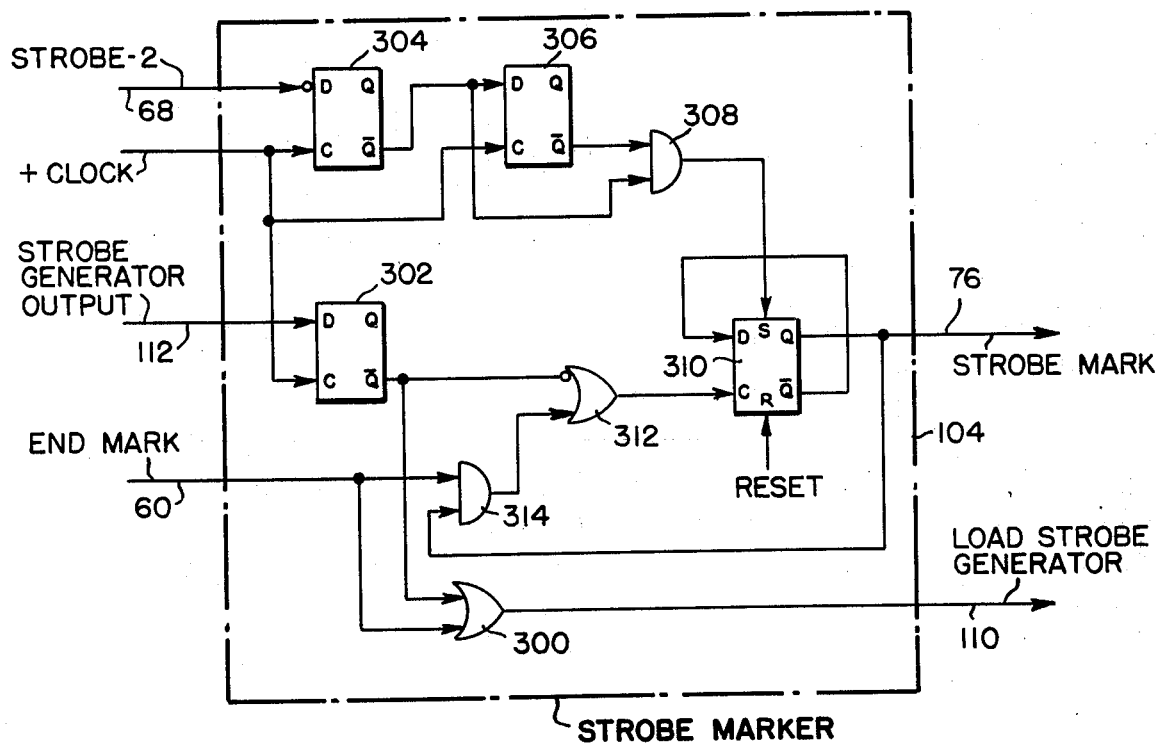
FIG. 8 is a detailed schematic diagram of the strobe marker shown more generally in block form in FIG. 3.

The strobe marker 104 is shown in more detail in FIG. 8. As shown there, the load strobe generator signal on line 110 constitutes the output of an OR gate 300 which is triggered by either an end mark signal on line 60 or the output of a flip-flop 302 which is, in turn, controlled by the strobe generator output on line 112. As shown in FIG. 8, flip-flops 304 and 306 are connected together with the strobe-2 input on line 68 and the clock pulses to provide two high inputs to gate 308 two clock cycles after a signal appears on strobe-2, line 68. Accordingly two clock cycles after the strobe-2 signal appears, the flip-flop 310 will be forceably set. Thereafter, flip-flop 310 is connected to toggle in response to each occurrence of a strobe generator output connected on line 112. Furthermore, the strobe mark output on line 76 representing the state of flip-flop 310 is resynchronized with the end mark appearing on line 60 by using it as one input to gate 314. Accordingly, when both the strobe mark on line 76 is present and an end mark signal is present on line 60, another input is presented to OR gate 312 to cause the flip-flop 310 to transition thus automatically resynchronizing the strobe mark with the actual occurrence of one of the actually detected binary bits or marks on the passing label.

Figure 9:
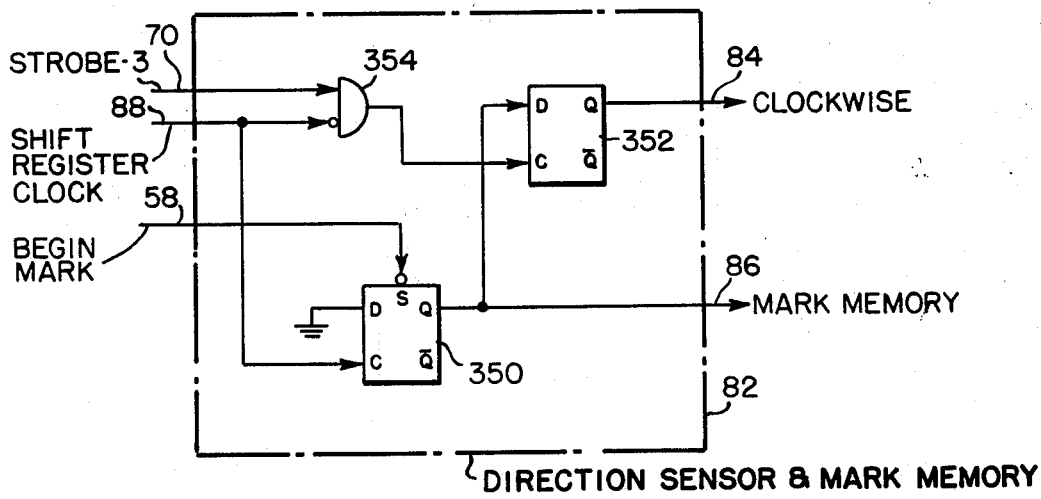
FIG. 9 is a detailed schematic diagram of the direction sensor and mark memory shown more generally in block form in FIG. 3.

The direction sensor and mark memory circuits are shown in more detail at FIG. 9. As shown, the begin mark signal on line 58 is utilized to directly set flip-flop 350 and thus provide a mark memory output on line 86. This state of affairs continues until the flip-flop 350 is clocked to transition in a reverse direction by shift register clock signal on line 88. The mark memory signal on line 86 is also utilized to condition a flip-flop 352. However, fli-flop 352 is only clocked or transitioned when signals appear on both line 70 representing the strobe-3 signal and line 88 representing the shift register clock signal. That is, AND gate 354 provides an output to clock the flip-flop 352 only during a time period when the third data cell is being read. Accordingly, depending upon the value of this data cell (i.e., whether there is a mark memory signal on line 86) a signal either will or will not be produced on line 84 representing the detection or non-detection of the direction bit and therefore the clockwise or counter-clockwise direction of motion involved.

Figure 10:
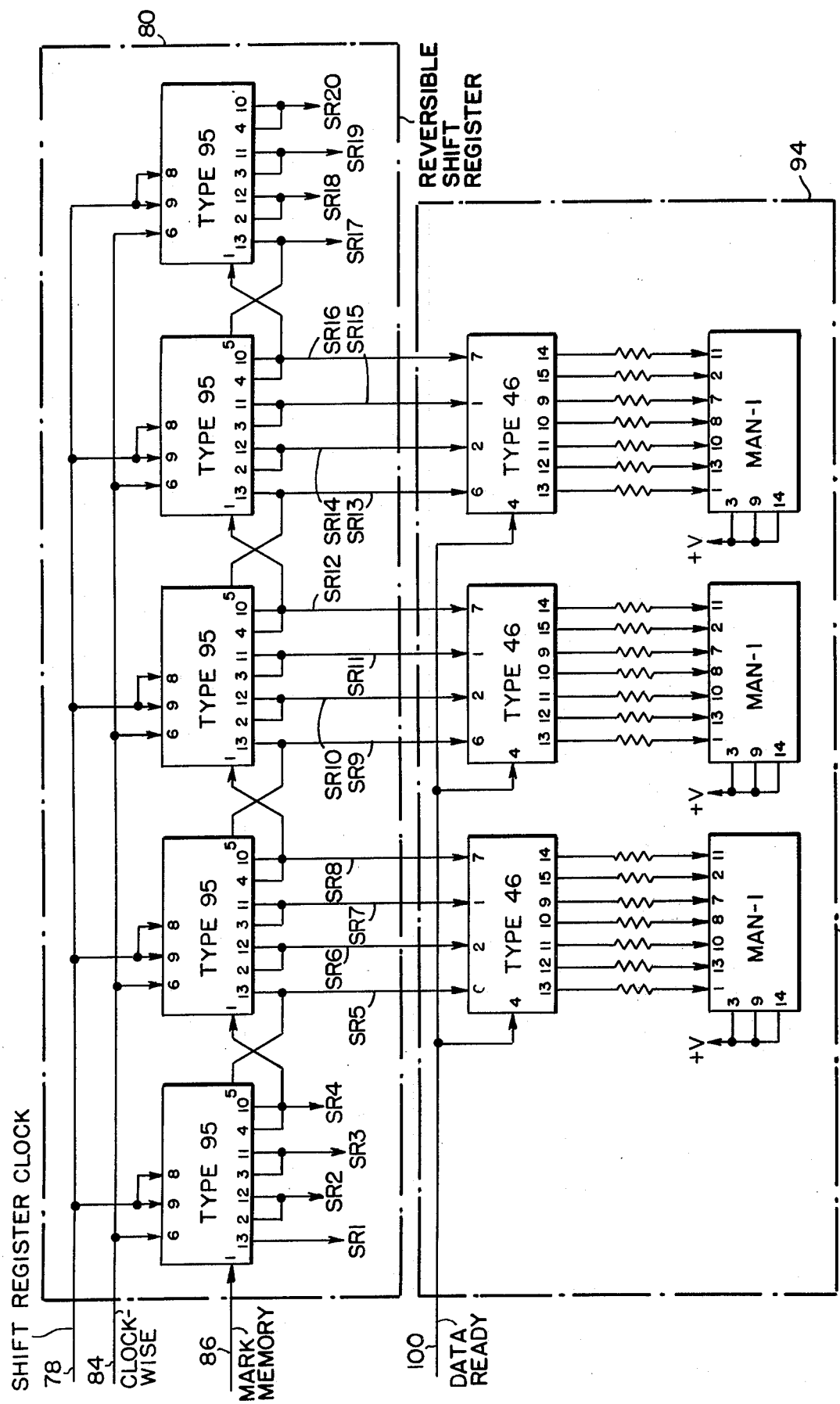
FIG. 10 is a detailed schematic diagram of the reversible shift register and data display circuit shown more generally in block form in FIG. 3.

The reversible shift register 80 is shown in more detail at FIG. 10. In the exemplary embodiment, there are 5 stages of the shift register, each stage comprising 4 binary digits. Conventional circuits are available for reversible shift registers and, for instance, in the exemplary embodiment each stage of the shift register might comprise one of integrated circuit type-95 circuits as shown in FIG. 10. The shift register clock signals appearing on line 78 and the direction of shifting is controlled by the clockwise signal on line 84. The data input comes from the mark memory signal on line 86. The twenty binary outputs are represented by SR1—SR20 as shown in FIG. 10.

The SR5-SR16 shift register outputs are shown connected to the data display circuit 94, in FIG. 10. In the exemplary embodiment, these binary inputs are first input to decoding circuits such as a plurality of integrated circuit type-46 which decode the individual digits of binary coded decimal into appropriate signals for driving seven segment optical displays as will be apparent to those in the art. The seven segment driving signals are output from each of the binary coded decimal stages of the decoders into appropriate seven element visual display apparatuses as will be apparent to those in the art. For instance, the display apparatus comprise conventional light emitting diode arrays, etc. As shown in FIG. 10, the exemplary utilizes a particular type of conventional seven element displays identified as MAN-1, manufactured by Monsanto. While the shift register stages SR5 through SR16 are continuously connected to the decoders, data is only transferred to the decoders when a signal is given on line 100. As previously indicated, the data ready signal on line 100 is generated only when other circuits detect that the register is indeed full and that no errors have been detected.

Figure 11:
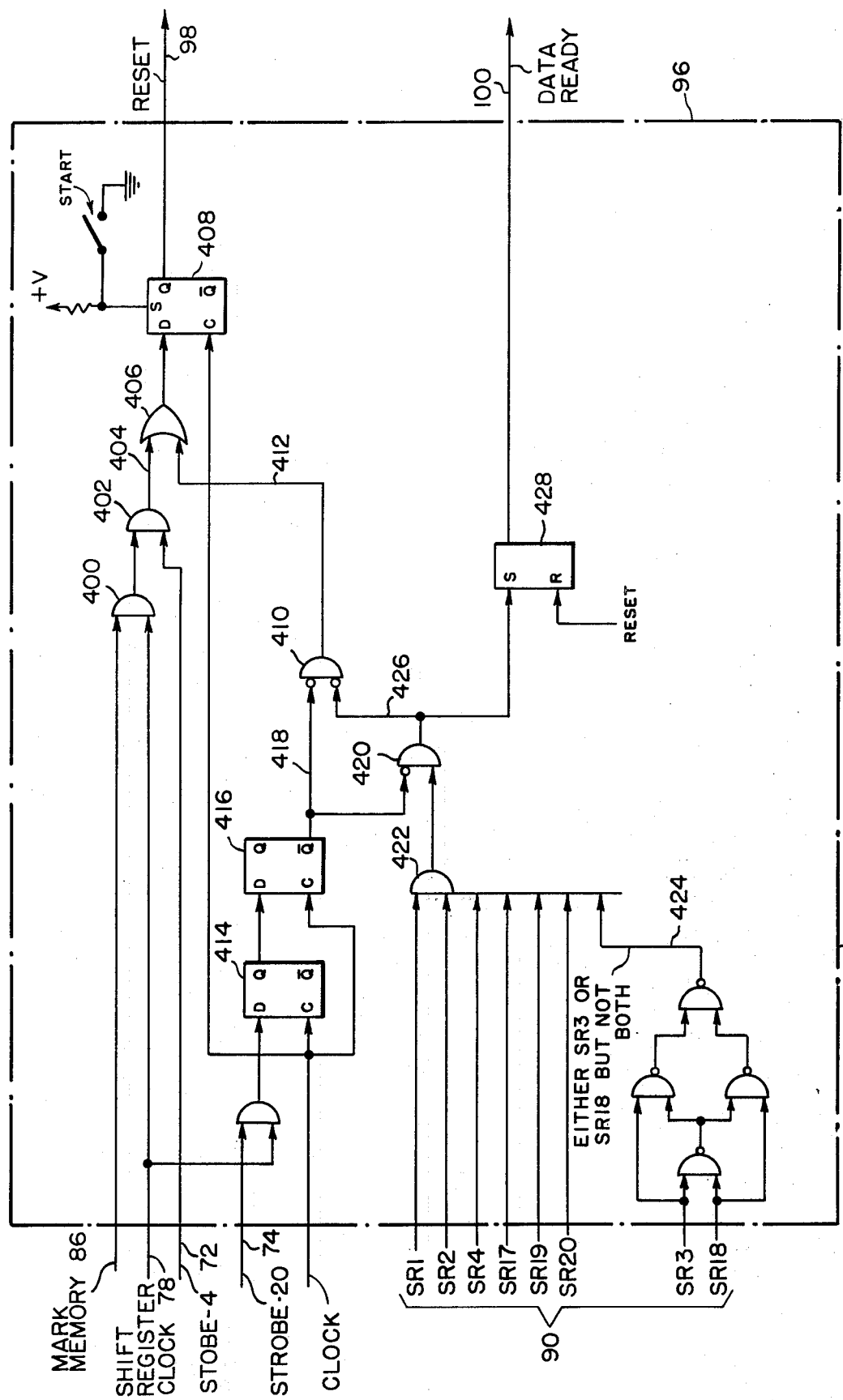
FIG. 11 is a detailed schematic diagram of the full register and error detecting circuits shown more generally in block form in FIG. 3.

The full register and error detector circuits 96 are shown in more detail at FIG. 11. AND gates 400 and 402 serve to effectively AND together the signals on line 72, 78, and 86 such that an output occurs on line 404 only if there is in fact a check bit detected in the fourth data cell of the label then being read. This output on line 404 is used as one input to an OR gate 406 which, is connected to condition flip-flop 408 such that a reset signal occurs on line 98 unless the check bit has in fact been detected as being present in the fourth data cell read in any given reading cycle.

A reset signal on line 98 may also be triggered through OR gage 406 by an output from AND gate 410 on line 412 as shown in FIG. 11. This output is effectively caused to occur only after the register is full and no other errors are detected. For instance, when the register is full the strobe-20 signal will occur on line 74. When this signal and the last shift register clock signal on line 78 have occurred (thus indicating that the last or 20th digit has already been shifted into the shift register) flip-flop 414 and 416 are enabled such that after 2 further successive clock pulse occurrences, the Q signal from flip-flop 416 on line 418 will go low. After inversion at the input of gate 410, this provides on high input to gate 410. It also provides another high input to gate 420 as shown in FIG. 11.

The other input to gate 420 is high only if all of the shift register stages 1 through 4 and 17 through 20 are properly filled according to a predetermined format for the labels for this exemplary embodiment. For instance, shift register stages 1, 2, 4, 17, 19 and 20 are all connected directly as inputs to AND gate 422 since all of these shift register stages in fact should be filled with "1's" corresponding to the timing check bits and the 4th data cell check bits which are to be encountered on either end of the label format. Data cells 3 and 18 are connected to NAND gates which effect an exclusion OR operation. That is, a signal appears on line 424 only if shift register stage 3 or shift register stage 18 but not both, contain "1". Accordingly, the AND gate 422 will provide a second high input to the AND gate 420 only if the first and last 4 stages of the shift register are properly filled with the predetermined format for these 8 data cells. If in fact no errors are detected, an output will be generated on line 426 which will set flip-flop 428 and cause a data ready signal to appear on line 100. On the other hand, if no such signal appears on line 426, as soon as the signal on line 418 goes low (2 clock cylces after the register is detected as being full) an output will be generated from gate 410 on line 412 to trigger a reset pulse on line 98.

While only one exemplary embodiment of this invention has been described in detail, those in the art will readily recognize that this invention may be embodied in many different forms without in any way departing from the spirit of the invention. For instance, for any given type of coding format, the specific decoding circuits, etc., will have to obviously be altered as appropriate depending upon the particular code format being utilized. Other types of equivalent modifications and/or circuit connections will be apparent to those in the art. Accordingly all such modifications are intended to be included within the scope of this invention.

What is claimed is:

1. A device for processing binary information marks coded as a series of binary valued marks each mark being represented by the presence of a sensible characteristic of one of two possible values on definite potential data locations which are of equal logitudinal extent on a relatively moving label independently of the then existing relative velocity therebetween said device comprising:
   a mark sensor for sensing the presence and binary value of said marks when passing thereby and for providing corresponding binary valued electrical mark pulses in response thereto,
   strobe timing means for detecting the transit time between at least two marks and for thereafter producing successive repetitive electrical strobe mark pulses which are timed to correspond to the expected subsequent occurrences of each potential information mark, and data register means connected to said mark sensor and to said strobe timing means for accumulating successive binary data values corresponding to the binary value of said mark pulses in time with the occurrence of said strobe mark pulses thereby registering the coded format of said information marks on the moving label.

2. A device as in claim 1 further comprising:
decoding means connected to said mark sensor and to said strobe timing means for detecting at least one predetermined information mark as a code representing the direction of said relative velocity and for producing a direction signal in response thereto, and wherein
said data register means comprises a reversible shift register connected to said decoding means for controlling the register shifting direction in dependence upon said direction signal whereby the final data register contents is the same regardless of the direction of said relative velocity.

3. A device as in claim 1, wherein said mark sensor comprises:
a bifurcated optical light pipe having first and second separate apertures at one end thereof and a third common aperture at the other end thereof,
said third aperture being adapted for mounting in proximity to said relatively moving label,
a light source disposed at said first aperture for providing incident illumination through said third aperture onto said relatively moving label, and
a photodetector means disposed at said second aperture for receiving reflected illumination from said third aperture.

4. A device as in claim 1, wherein said mark sensor comprises:
optical means for optically sensing said information marks and for providing an electrical mark pulse in response thereto.

5. A device as in claim 1, wherein said strobe timing means comprises:
a clock for providing regular recurrent clock pulses,
a velocity register means for counting the number of said clock pulses which occur between at least two of said mark pulses, and
means for cyclically recounting substantially the same said number of clock pulses thereafter and for producing a strobe mark pulse at the conclusion of each such recounting thereby simulating the time occurrence of successive potentially present mark pulses by timing the strobe mark pulses to occur at intervals corresponding to the timing interval measured between said at least two mark pulses.

6. A device as in claim 5, wherein said means for cyclically recounting comprises:
a down counting counter connected for decrementing by said clock pulses,
means for loading said down counting counter with said number from said velocity register after each cyclic decrementing thereof to a predetermined counter contents, and
means for producing said strobe mark pulse after said predetermined counter contents is reached.

7. A device as in claim 1, wherein said strobe timing means further comprises:
shift register clock generating means connected to receive both said mark pulses and said strobe mark pulses and for producing a shift register clock pulse in response to either.

8. A device as in claim 7, wherein said data register means comprises:
a shift register with a data input connected to receive said mark pulses and a shift input connected to receive said shift register clock pulses whereby a first binary digit value is shifted into said register when both a mark pulse and a corresponding strobe mark pulse occur and a second binary digit value is shifted into said register when only a strobe mark pulse occurs.

9. A device as in claim 8, further comprising:
digital data decoding and display means connected to at least some stages of said shift register for displaying the processed information in a desired format.

10. A device as in claim 9, further comprising:
error detection means connected to at least some stages of said shift register for detecting a predetermined code and for enabling said display means only if said predetermined code is detected and for otherwise resetting said device to automatically restart another processing cycle for said information marks.

* * * * *